US010389413B2

(12) United States Patent
Petersson et al.

(10) Patent No.: US 10,389,413 B2
(45) Date of Patent: Aug. 20, 2019

(54) CONFIGURATION OF BEAMFORMING SETTINGS

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Göteborg (SE); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 186 days.

(21) Appl. No.: 15/302,616

(22) PCT Filed: Sep. 23, 2016

(86) PCT No.: PCT/SE2016/072660
§ 371 (c)(1),
(2) Date: Oct. 7, 2016

(65) Prior Publication Data

US 2018/0205420 A1    Jul. 19, 2018

(51) Int. Cl.
| H04B 7/0408 | (2017.01) |
| H04B 7/06 | (2006.01) |
| H04B 7/08 | (2006.01) |
| H04L 5/00 | (2006.01) |
| H04W 72/08 | (2009.01) |

(52) U.S. Cl.
CPC ......... *H04B 7/0408* (2013.01); *H04B 7/0617* (2013.01); *H04B 7/0632* (2013.01); *H04B 7/088* (2013.01); *H04L 5/0057* (2013.01); *H04W 72/085* (2013.01); *H04B 7/0874* (2013.01)

(58) Field of Classification Search
CPC .. H04B 7/0408; H04B 7/0632; H04B 7/0617; H04L 5/0057; H04W 72/085
See application file for complete search history.

(56) References Cited

U.S. PATENT DOCUMENTS

| 2013/0028341 | A1 | 1/2013 | Ayach et al. |
| 2014/0185481 | A1 | 7/2014 | Seol et al. |
| 2014/0341310 | A1* | 11/2014 | Rahman ............... H04B 7/0408 375/260 |

OTHER PUBLICATIONS

International Search Report and Written Opinion dated Jun. 1, 2017 in International Application No. PCT/EP2016/072660, 13 pages.

* cited by examiner

*Primary Examiner* — Dady Chery
(74) *Attorney, Agent, or Firm* — Rothwell, Figg, Ernst & Manbeck, p.c.

(57) ABSTRACT

There is provided mechanisms for configuring beamforming settings. A method is performed by a wireless radio transceiver device comprising at least two receiver chains. The method comprises receiving transmission from an access node in at least two beams, each beam using a separate one of the two receiver chains. The method comprises configuring beamforming settings in at least one of the receiver chains for reception of the transmission in at least one of the beams for evaluating at least one candidate beam. The method comprises fixing beamforming settings in at least one other of the receiver chains for reception of the transmission in at least one other of the beams.

22 Claims, 5 Drawing Sheets

CONFIGURATION OF BEAMFORMING SETTINGS

CROSS-REFERANCE TO RELATED APPLICATION(S)

This application is a 35 U.S.C § 371 national Phase Entry Application from PCT/EP2016/072660, filed Sep. 23, 2016, and designating the United States.

TECHNICAL FIELD

Embodiments presented herein relate to a method, a wireless radio transceiver device, a computer program, and a computer program product for configuring beamforming settings of the wireless radio transceiver device.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for wireless radio transceiver devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the access node of the network and at the wireless radio transceiver devices might be required to reach a sufficient link budget.

The wireless radio transceiver devices could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless radio transceiver devices, different implementations will be needed.

When the wireless radio transceiver devices uses analog beamforming it could be challenging for the wireless radio transceiver devices to determine if a currently used beam produced by using the analog beamforming is a good beam in terms of a given signal quality criterion or if there exist other beams that if generated by the analog beamforming would perform significantly better in terms of the given signal quality criterion. In order to evaluate if any other such beam is better a beam finding procedures, for example using beam reference signals (BRS), could be used. However, performing such a procedure typically requires comparatively much overhead signaling between the access node and the wireless radio transceiver device which, thus, will temporarily occupy radio resources and increase the average interference in the network.

Hence, there is a need for an improved beam finding procedure.

SUMMARY

An object of embodiments herein is to enable efficient beam finding for a wireless radio transceiver device.

According to a first aspect there is presented a method for configuring beamforming settings. The method is performed by a wireless radio transceiver device comprising at least two receiver chains. The method comprises receiving transmission from an access node in at least two beams, each beam using a separate one of the two receiver chains. The method comprises configuring beamforming settings in at least one of the receiver chains for reception of the transmission in at least one of the beams for evaluating at least one candidate beam. The method comprises fixing beamforming settings in at least one other of the receiver chains for reception of the transmission in at least one other of the beams.

Advantageously this provides efficient configuring of beamforming settings for the wireless radio transceiver device.

Advantageously this method enables the wireless radio transceiver device to test any number of candidate beams in order to improve the link budget and thus increase throughput in terms of bits per seconds without a large overhead.

According to a second aspect there is presented a wireless radio transceiver device. The wireless radio transceiver device is configured for configuring beamforming settings. The wireless radio transceiver device comprises at least two receiver chains and further comprises processing circuitry. The processing circuitry is configured to cause the wireless radio transceiver device to receive transmission from an access node in at least two beams, each beam using a separate one of the two receiver chains. The processing circuitry is configured to cause the wireless radio transceiver device to configure beamforming settings in at least one of the receiver chains for reception of the transmission in at least one of the beams for evaluating at least one candidate beam. The processing circuitry is configured to cause the wireless radio transceiver device to fix beamforming settings in at least one other of the receiver chains for reception of the transmission in at least one other of the beams.

According to a third aspect there is presented a wireless radio transceiver device. The wireless radio transceiver device is configured for configuring beamforming settings. The wireless radio transceiver device comprises at least two receiver chains and further comprises processing circuitry and a computer program product. The computer program product stores instructions that, when executed by the processing circuitry, causes the wireless radio transceiver device to perform operations, or steps. The operations, or steps, cause the wireless radio transceiver device to receive transmission from an access node in at least two beams, each beam using a separate one of the two receiver chains. The operations, or steps, cause the wireless radio transceiver device to configure beamforming settings in at least one of the receiver chains for reception of the transmission in at least one of the beams for evaluating at least one candidate beam. The operations, or steps, cause the wireless radio transceiver device to fix beamforming settings in at least one other of the receiver chains for reception of the transmission in at least one other of the beams.

According to a fourth aspect there is presented a wireless radio transceiver device. The wireless radio transceiver device is configured for configuring beamforming settings.

The wireless radio transceiver device comprises at least two receiver chains. The wireless radio transceiver device further comprises a receive module configured to receive transmission from an access node in at least two beams, each beam using a separate one of the two receiver chains. The wireless radio transceiver device further comprises a configure module configured to configure beamforming settings in at least one of the receiver chains for reception of the transmission in at least one of the beams for evaluating at least one candidate beam. The wireless radio transceiver device further comprises a fixing module configured to fix beamforming settings in at least one other of the receiver chains for reception of the transmission in at least one other of the beams.

According to a fifth aspect there is presented a computer program for configuring beamforming settings, the computer program comprising computer program code which, when run on a wireless radio transceiver device, causes the wireless radio transceiver device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
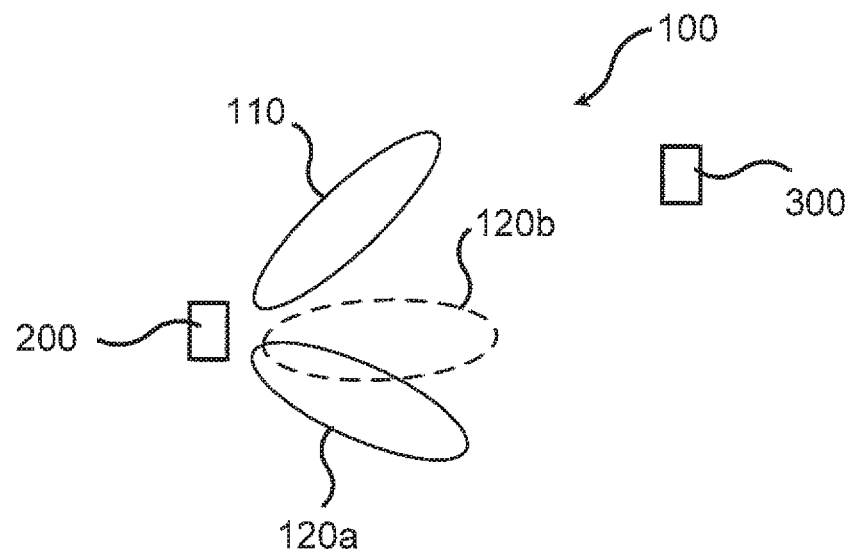
FIG. 1 is a schematic diagram illustrating a communication network according to embodiments.

FIG. 1 is a schematic diagram illustrating a communications network 100 comprising an access node 300 providing network access to a wireless radio transceiver device 200. The access node 300 could be any of a radio access network node, radio base station, base transceiver station, node B, evolved node B, or access point. The wireless radio transceiver device 200 could be any of portable wireless device, mobile station, mobile phone, handset, wireless local loop phone, user equipment (UE), smartphone, laptop computer, tablet computer, or wireless sensor.

The wireless radio transceiver device 200 is assumed to comprise at least two receiver chains and is thus configured to at least receive signals from the access node 300 in as many beams 110, 120a. Assume that the wireless radio transceiver device 200 seeks to evaluate another candidate beam 120b (by for example measuring reference symbol received power (RSRP) in the candidate beam) for transmission to, and reception from, the access node 300. As will be further disclosed below, according to embodiments disclosed herein, the wireless radio transceiver device 200 selects at least one receiver chain (preferably at least the one with lowest received signal power or lowest SINR), finds a candidate beam and switches to that beam for a short period of time during downlink reception whilst keeping at least one other receiver chain fixed.

Figure 2:
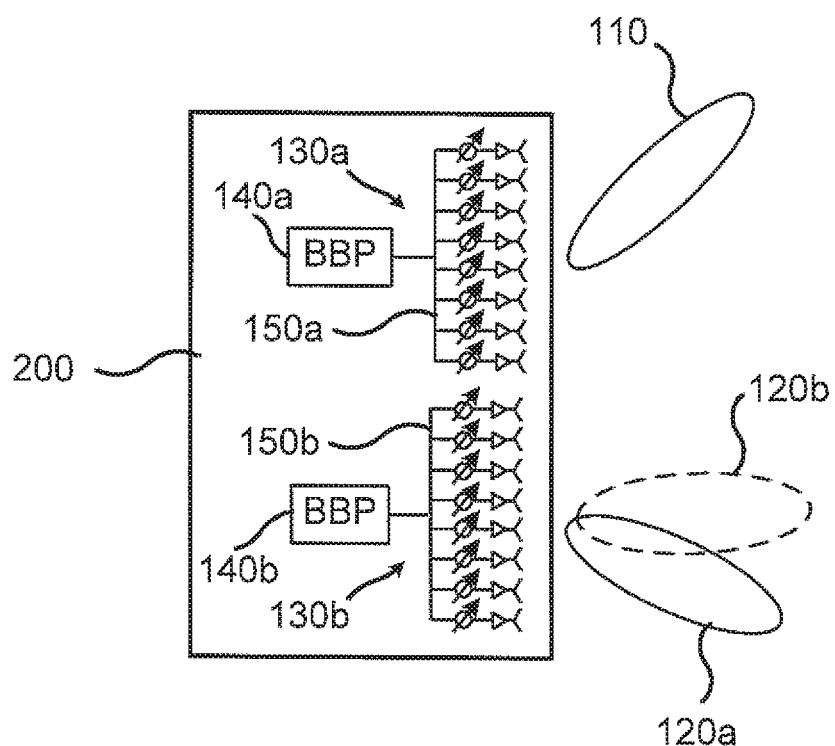
FIG. 2 schematically illustrates a wireless radio transceiver device according to an embodiment.

FIG. 2 illustrates the wireless radio transceiver device 200 according to an embodiment. The wireless radio transceiver device 200 is equipped with two receiver chains 130a, 130b, each comprising its own baseband processing (BPP) chain 140a, 140b and where each baseband processing chain 140a, 140b is operatively connected to its own analog beamformer 150a, 150b. For illustrative purposes it is assumed that receiver chain 130a is configured to receive transmissions from the access node 300 in beam 110 and that receiver chain 130b is configured to receive transmissions from the access node 300 selectively in either beam 120a or 120b.

The embodiments disclosed herein thus relate to mechanisms for configuring beamforming settings. In order to obtain such mechanisms there is provided a wireless radio transceiver device 200, a method performed by the wireless radio transceiver device 200, a computer program product comprising code, for example in the form of a computer program, that when run on a wireless radio transceiver device 200, causes the wireless radio transceiver device 200 to perform the method.

Figure 3:
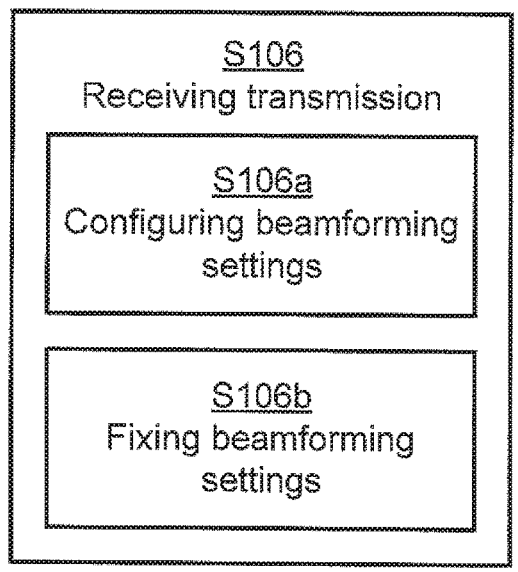
FIGS. 3, 4, 5, and 6 are flowcharts of methods according to embodiments.
Figure 4:
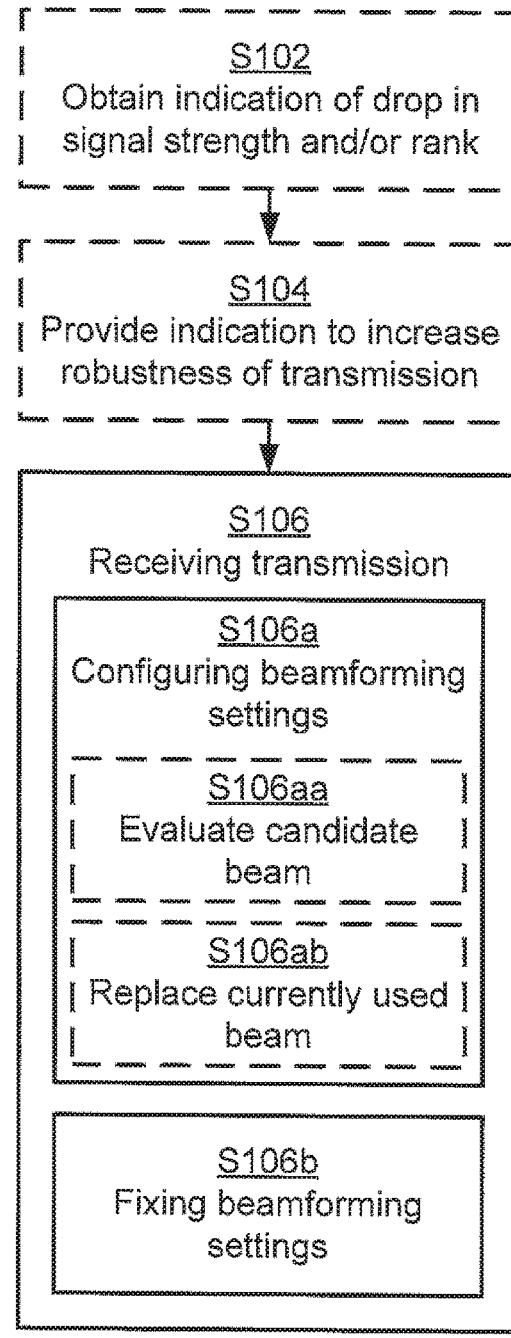

FIGS. 3 and 4 are flow charts illustrating embodiments of methods for configuring beamforming settings. The methods are performed by the wireless radio transceiver device 200. The methods are advantageously provided as computer programs 920.

Reference is now made to FIG. 3 illustrating a method for configuring beamforming settings as performed by the wireless radio transceiver device 200 according to an embodiment. The wireless radio transceiver device 200 comprises at least two receiver chains 130a, 130b.

S106: The wireless radio transceiver device 200 receives transmission from an access node 300 in at least two beams 110, 120a. Each beam uses a separate one of the at least two receiver chains 130a, 130b.

It assumed that the radio transceiver device 200 seeks to evaluate a candidate beam 120b for transmission to, and reception from, the access node 300. The radio transceiver device 200 is therefore configured to perform step S106a when receiving the transmission in step S106:

S106a: The wireless radio transceiver device 200 configures beamforming settings in at least one of the receiver chains 130a, 130b for reception of the transmission in at least one of the beams 120b for evaluating at least one candidate beam 120b.

It is further assumed that the radio transceiver device 200 seeks to avoid the issues noted above. The radio transceiver device 200 is therefore configured to perform step S106b whilst performing step S106a:

S106b: The wireless radio transceiver device 200 fixes beamforming settings in at least one other of the receiver chains 130a, 130b for reception of the transmission in at least one other of the beams 110.

Steps S106a and S106b may be regarded as being performed in parallel.

The wireless radio transceiver device 200 is thereby configured to select at least one, but not all, of the receiver chains 130a, 130b, find a candidate beam 120b and switch to that beam 120b for a short period of time whilst keeping the remaining receiver chains fixed.

Embodiments relating to further details of receiving transmission from an access node 300 as performed by the wireless radio transceiver device 200 will now be disclosed.

Reference is now made to FIG. 4 illustrating methods for configuring beamforming settings as performed by the wireless radio transceiver device 200 according to further embodiments. It is assumed that steps S106, S106a, S106b are performed as described above with reference to FIG. 3 and a thus repeated description thereof is therefore omitted Assume that the access node 300 is communicating with the wireless radio transceiver device 200 and that the wireless radio transceiver device 200 is using beam 110 of the first receiver chain 130a and beam 120a of the second receiver chain 130b and that the wireless radio transceiver device 200 seeks to evaluate if there are any better beams available.

There may be different ways for the wireless radio transceiver device 200 to evaluate the configuring of the beamforming settings in step S106a.

According to some aspects the wireless radio transceiver device 200 compares the performance of the candidate beam 120b to the currently used beam 120a for receiving the transmission by the wireless radio transceiver device 200. Hence, according to an embodiment the wireless radio transceiver device 200 is configured to perform step S106aa as part of step S106:

S106aa: The wireless radio transceiver device 200 evaluates the at least one candidate beam 120b by comparing performance metrics between this at least one candidate beam 120b and a currently used beam 110, 120a for receiving the transmission by the wireless radio transceiver device 200.

There may be different ways for the wireless radio transceiver device 200 to act when having compared the performance metrics. If the performance metric of the candidate beam 120b is better than the performance metric of the currently used beam 110, 120a, then the wireless radio transceiver device 200 could replace the currently used beam 120a with the candidate beam 120b. Hence, according to an embodiment the wireless radio transceiver device 200 is configured to perform step S106ab as part of step S106:

S106ab: The wireless radio transceiver device 200 replaces the currently used beam 110, 120a with one of the at least one candidate beam 120b when this one of the at least one candidate beam 120b has better performance metric than the currently used beam 110, 120a.

The currently used beam could be at least one other of the beams 110 for which the beamforming settings are fixed in step S106b. Alternatively, the currently used beam is the at least one of the beams 120a for which the beamforming settings are configured. Hence, either one of beam 110 and beam 120a could be replaced by beam 120b There may be different ways for the wireless radio transceiver device 200 to select which receiver chain 130a, 130b to use for the candidate beam 120b. According to an embodiment the receiver chain having worst performance metric of all the receiver chains 130a, 130b has its beamforming settings configured in step S106a.

For example, the wireless radio transceiver device 200 could select the receiver chain 130b associated with the lowest received signal power (or lowest SINR). Hence, according to an embodiment the performance metric is based on received power of the transmission. Further, for which of the receiver chains 130a, 130b to configure the beamforming settings could depend on downlink measurements.

With reference again to FIG. 1, it is assumed that beam 120a has lowest received signal power, and hence the wireless radio transceiver device 200 determines to evaluate a candidate beam 120b for beam 120a. During a later downlink (DL) transmission the wireless radio transceiver device 200 thus changes its beamforming from reception in beam 120a to reception in beam 120b.

The measured received power could be based on reference signals and/or other signals (for example data signals). One advantage with using reference signals is that then the wireless radio transceiver device 200 will know that the measured received power comes only from the access node 300 that is serving the wireless radio transceiver device 200. When measuring on other signals there is a risk that parts of the received power also comes from other access nodes not serving the wireless radio transceiver device 200, hence introducing some uncertainties. In some subframes there might be zero or only a few reference signals such that the candidate beam 120b cannot be evaluated for reference signals, in this case data signals can be used instead.

There may be different metrics to be used when evaluating the performance of the reception using the candidate beam 120b. For example, the reception of the transmission from an access node could be evaluated based on received signal strength, signal to noise ratio (SNR), Signal to Interference and Noise Ratio (SINR), rank, or (predicted) bitrate.

There may be different triggers for when the configuring of beamforming settings should be performed. For example, the wireless radio transceiver device 200 could be configured to initiate configuring of the beamforming settings when the signal strength has dropped below a threshold signal strength value, dropped at a rate higher than a threshold rate value, or that the rank in the radio channel is worse than a threshold rank value. Hence, according to an embodiment the radio transceiver device 200 is configured to perform step S102:

S102: The radio transceiver device 200 obtains an indication of at least one of drop in signal strength and channel rank of the transmission from an access node 300, and the configuring the beamforming settings in step S106a is performed in response thereto.

In some aspects the wireless radio transceiver device 200 is configured to at regular time intervals, such as periodically, evaluate candidate beams in order to investigate if there are any better beams than the ones currently used. Hence, according to an embodiment the configuring of the beamforming settings in step S106a is performed according to a schedule.

In some aspects the wireless radio transceiver device 200 is configured to indicate to the access node 300 to change transmission format in order for the wireless radio transceiver device 200 to perform the configuration in step S106a in such a manner that the risk of a failed data transmission is reduced. Hence, according to an embodiment the wireless radio transceiver device 200 is configured to perform step S104:

S104: The wireless radio transceiver device 200 provides an indication to the access node 300 to increase robustness of modulation and coding scheme or rank in a later transmission resource, and the configuring of the beamforming settings in step S106 is then performed during this later transmission resource.

This indication can either be defined by explicit signalling or implicit signalling.

According to an embodiment, an explicit signalling is used which can for example be a signal known both at the wireless radio transceiver device 200 and the access node 300 such that the access node 300 knows that the wireless radio transceiver device 200 will perform beam training and hence uses a transmission format accordingly. Hence, according to an embodiment the indicator transmitted in step S104 requests the access node 300 to enable the wireless radio transceiver device 200 to evaluate a candidate beam 120b. For example, the indicator could be a dedicated candidate beam evaluation message.

According to an embodiment, implicit signalling is used, for example the wireless radio transceiver device 200 can signal a reduced Signal to Interference and Noise Ratio (SINR), such that the access node 300 increases the density of reference signals and uses a stronger coding of the data signals. One example of implicit signalling is thus that the wireless radio transceiver device 200, with purpose, signals a faked reduced SINR, which could lead to the access node 300 using an increased density of reference signals and a reduced modulation and coding scheme (MCS). Hence, according to an embodiment the indicator transmitted in step S104 is a message comprising at least one of a Channel Quality Indictor (CQI), and Rank Indicator (RI).

There may be different ways for the radio transceiver device 200 to determine in which candidate beam 120b to receive the transmission in step S106. For example, the candidate beam 120b can be chosen based on earlier statistics, physical structure of the wireless radio transceiver device 200 and the antennas of the wireless radio transceiver device 200, etc. hence, according to an embodiment each of the at least one candidate beam has a unique combination of pointing direction and beam width, and at least one of the pointing direction and the beam width of each of the at least one candidate beam is based on at least one of measurement statistics and physical properties of the wireless radio transceiver device 200.

There may be different examples of during how many transmission resources the beamforming settings are configured. For example, the beamforming settings could be configured only temporary. According to an embodiment the beamforming settings are configured for reception of the transmission only in a single transmission resource.

There are different examples of transmission resources. In general terms, a transmission resource has a duration in time and frequency. According to an embodiment each transmission resource corresponds to a single orthogonal frequency-division multiplexing (OFDM) symbol, a single subframe, or a single Transmission Time Interval (TTI). However, alternatively, ach each transmission resource corresponds to multiple OFDM symbols, subframes, or TTIs.

With reference again made to FIG. 2 the wireless radio transceiver device 200 is equipped with at least two receiver chains 130a, 130b, each comprising its own baseband processing (BPP) chain 140a, 140b. According to an embodiment each receiver chain 130a, 130b thus comprises its own baseband processor 140a, 140b, and each baseband processor 140a, 140b is configured when the beamforming settings are configured in step S106a.

Further, as also disclosed above with reference to the illustrative example of FIG. 2, each baseband processing chain 140a, 140b is operatively connected to its own analog beamformer 150a, 150b.

Figure 5:
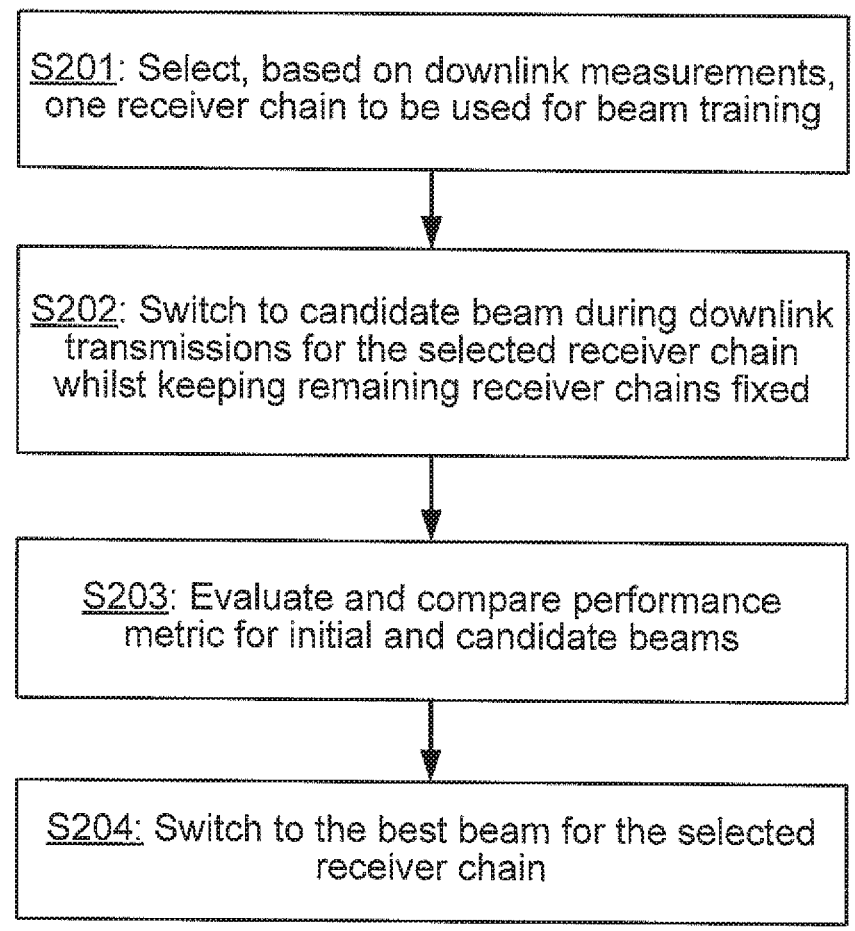

FIG. 5 is a flowchart of a particular embodiment for configuring beamforming settings as performed by the wireless radio transceiver device 200.

Step S201: The wireless radio transceiver device 200 seeks to evaluate a candidate beam using one of the receiver chains 130a, 130b. The wireless radio transceiver device 200 identifies the receiver chain 130b with lowest received signal power (or lowest SINR) and finds a candidate beam 120b for the corresponding analog beamformer 150a, 150b. One way to implement step S201 is to perform step S102.

Step S202: The wireless radio transceiver device 200 receives downlink transmission from the serving access node 300 and for some period of time during this downlink transmission the wireless radio transceiver device 200 changes from the initial beam 120a to the candidate beam 120b for the selected receiver chain 130b and perform measurements. One way to implement step S202 is to perform any of steps S106, S106a, S106b.

Step S203: The wireless radio transceiver device 200 evaluates and compares performance of using the candidate beam 120b compared to the initial beam 120a with respect to some metric. One way to implement step S203 is to perform step S106aa.

Step S204: The wireless radio transceiver device 200 switches to that of the initial beam 120a and the candidate beam 120b that gives best performance. One way to implement step S204 is to perform step S106ab.

Figure 6:
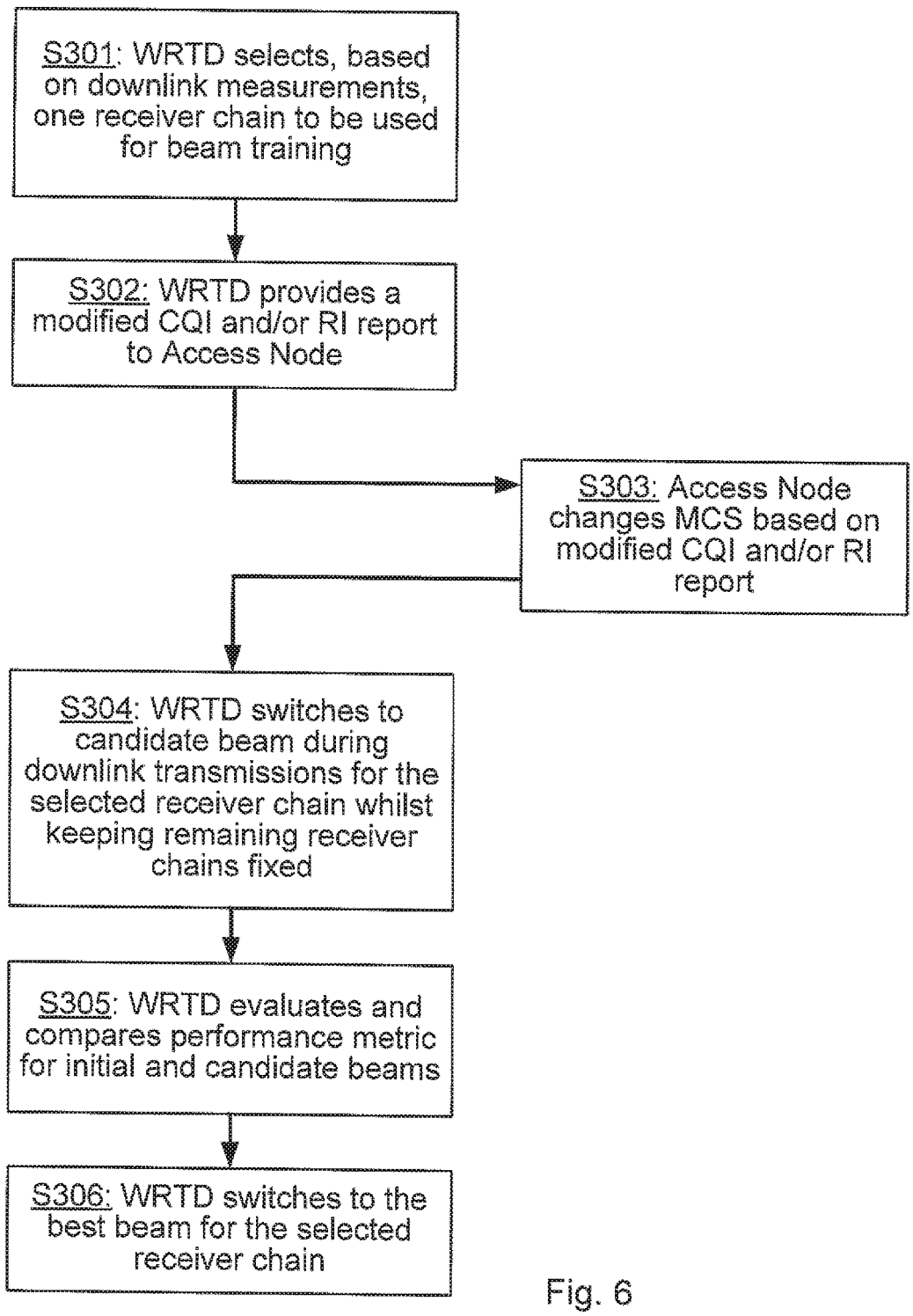

FIG. 6 is a flowchart of a particular embodiment for configuring beamforming settings as performed by the wireless radio transceiver device 200 (denoted WRTD) and the access node 300 (denoted AN). In some scenarios there could be a risk that the received signal strength (or SINR) drops significantly for the candidate beam 120b (compared to the initial beam 120a), which could lead to difficulties during demodulation of downlink data signals. In order to mitigate this problem, before the change to the candidate beam 120b the wireless radio transceiver device 200 can signal a modified CQI and RI report to the access node 300. The modified CQI and RI could be determined such that the data can be demodulated even if no decodable signal is received by the wireless radio transceiver device 200 using the candidate beam 120b. One way to achieve this is to base the CQI and RI on only the remaining receiver chains 130a that will not be used for beam training. This is illustrated in the particular embodiment for configuring beamforming settings in FIG. 6.

Step S301: The wireless radio transceiver device 200 seeks to evaluate a candidate beam using one of the receiver chains 130a, 130b. The wireless radio transceiver device 200 identifies the receiver chain 130b with lowest received signal power (or lowest SINR) and finds a candidate beam 120b for the corresponding analog beamformer 150a, 150b. One way to implement step S301 is to perform step S102.

S302: The wireless radio transceiver device 200 provides a modified CQI and/or RI report to the access node 300 with purpose of the access node 300 changing transmission format. One way to implement step S302 is to perform step S104.

S303: The access node 300 changes the transmission format to make the coding of the data signals more robust by adapting the modulation and coding scheme (MCS) and rank of the coming downlink data transmission according to the modified CQI and/or RI report.

Step S304: The wireless radio transceiver device 200 receives downlink transmission from the serving access node 300 using the adapted MCS and rank and for some period of time during this downlink transmission the wireless radio transceiver device 200 changes from the initial beam 120a to the candidate beam 120b for the selected receiver chain 130b and perform measurements. One way to implement step S304 is to perform any of steps S106, S106a, S106b.

Step S305: The wireless radio transceiver device 200 evaluates and compares performance of using the candidate beam 120b compared to the initial beam 120a with respect to some metric. One way to implement step S305 is to perform step S106aa.

Step S306: The wireless radio transceiver device 200 switches to that of the initial beam 120a and the candidate beam 120b that gives best performance. One way to implement step S306 is to perform step S106ab.

Figure 7:
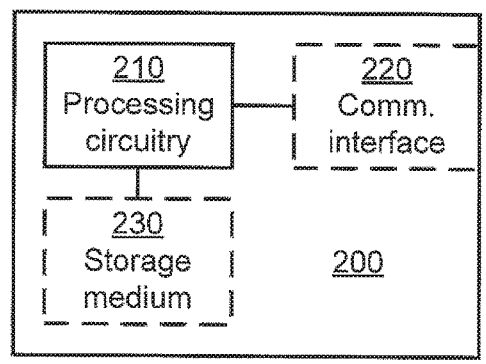
FIG. 7 is a schematic diagram showing functional units of a wireless radio transceiver device according to an embodiment.

FIG. 7 schematically illustrates, in terms of a number of functional units, the components of a wireless radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless radio transceiver device 200 to perform a set of operations, or steps, S102-S106b, S201-S204, S301, S302, S304, S305, S306, as disclosed above. For example, the storage medium 230 may store the set of operations, and the processing circuitry 210 may be configured to retrieve the set of operations from the storage medium 230 to cause the wireless radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The wireless radio transceiver device 200 may further comprise a communications interface 220 at least configured for communications with the access node 300. As such the communications interface 220 may comprise one or more of transmitters and receivers, comprising analogue and digital components. The processing circuitry 210 controls the general operation of the wireless radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the wireless radio transceiver device 200 are omitted in order not to obscure the concepts presented herein.

Figure 8:
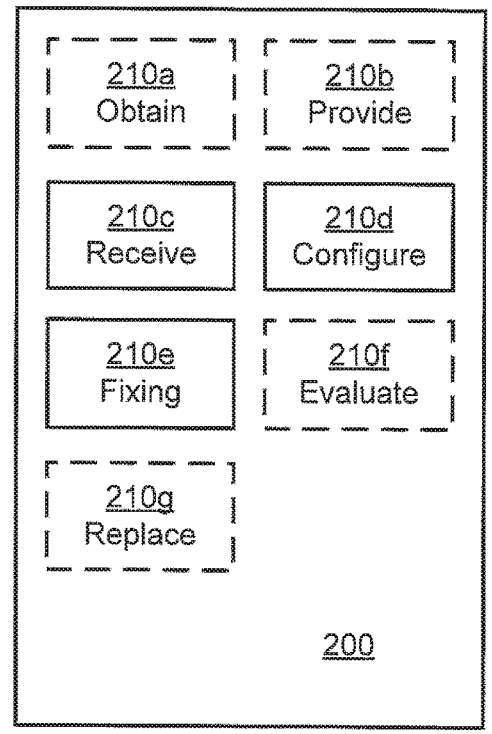
FIG. 8 is a schematic diagram showing functional modules of a wireless radio transceiver device according to an embodiment.

FIG. 8 schematically illustrates, in terms of a number of functional modules, the components of a wireless radio transceiver device 200 according to an embodiment. The wireless radio transceiver device 200 of FIG. 8 comprises a number of functional modules; a receive module 210C configured to perform step S106, a configure module 210d configured to perform step S106a, and a fixing module 210e configured to perform step S106b. The wireless radio transceiver device 200 of FIG. 8 may further comprises a number of optional functional modules, such as any of an obtain module 210a configured to perform step S102, a provide module 210b configured to perform step S104, and evaluate module 210f configured to perform step S106aa, and a replace module 210g configured to perform step S106ab. In general terms, each functional module 210a-210g may in one embodiment be implemented only in hardware or and in another embodiment with the help of software, i.e., the latter embodiment having computer program instructions stored on the storage medium 230 which when run on the processing circuitry makes the wireless radio transceiver device 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with functional units 220 and/or 230. The processing circuitry 210 may thus be configured to from the storage medium 230 fetch instructions as provided by a functional module 210a-210g and to execute these instructions, thereby performing any steps as disclosed herein.

The radio transceiver device 200 may be provided as a standalone device or as a part of at least one further device. For example, the radio transceiver device 200 may be implemented in, part of, or co-located with, an access node or a wireless device. Hence, according to some aspects there is provided an access node and/or wireless device comprising a radio transceiver device 200 as herein disclosed.

Further, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 7 the processing circuitry 210 may be distributed among a plurality of devices, or nodes. The same applies to the functional modules 210a-210g of FIG. 8 and the computer program 920 of FIG. 9 (see below).

Figure 9:
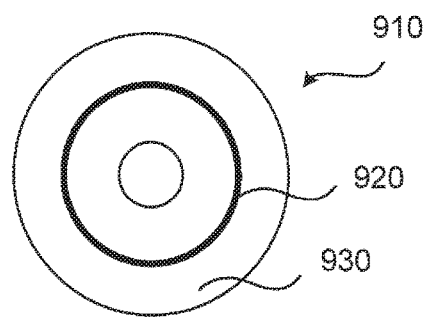
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring beamforming settings, the method being performed by a wireless radio transceiver device comprising a first receiver chain and a second receiver chain, the method comprising:
    configuring the first receiver chain to receive transmissions from an access node via a first beam:
    configuring the second receiver chain to receive transmissions from the access node via a second beam;
    obtaining a first performance indicator for the first beam based on a transmission from the access node received via the first beam and the first receiver chain;
    obtaining a second performance indicator for the second beam based on a transmission from the access node received via the second beam and the second receiver chain;
    based on the first and second performance indicators, determining whether the first beam is performing better than the second beam;
    as a result of determining that the first beam is performing better than the second beam, configuring the second receiver chain to receive transmissions from the access node via a candidate beam, wherein, while the second receiver chain is configured to receive transmissions from the access node via the candidate beam, the first receiver chain continues to be configured to receive transmissions from the access node via the first beam; and
    evaluating the candidate beam.

2. The method according to claim 1, wherein evaluating the candidate beam comprises:
    comparing performance metrics between the candidate beam and one or more of the first beam and the second beam.

3. The method according to claim 2, further comprising:
    replacing the second beam with the candidate beam when the candidate beam has better performance metric than one or more of the first beam and the second beam.

4. The method according to claim 2, wherein the performance metrics are based on one or more of received signal strength, signal to noise ratio (SNR), signal to interference and noise ratio (SINR), rank, and bitrate.

5. The method according to claim 1, wherein
    configuring the first receiver chain to receive transmissions from the access node comprises configuring the first receiver chain to receive transmissions of reference signals from the access node, and
    configuring the second receiver chain to receive transmissions from the access node comprises configuring the second receiver chain to receive transmissions of reference signals from the access node.

6. The method according to claim 1, wherein
    configuring the first receiver chain to receive transmissions from the access node comprises configuring the first receiver chain to receive transmissions of data signals from the access node when the candidate beam cannot be evaluated based on transmissions of reference signals, and
    configuring the second receiver chain to receive transmissions from the access node comprises configuring the second receiver chain to receive transmissions of data signals from the access node when the candidate beam cannot be evaluated based on transmissions of reference signals.

7. The method according to claim 1, wherein configuring the second receiver chain to receive transmissions from the access node via the candidate beam is performed as a result of determining that:
    a signal strength of a received signal is below a threshold signal strength value;
    a dropping rate of signal strength of the received signal is higher than a threshold rate value; or
    a rank in a radio channel is worse than a threshold rank value.

8. The method according to claim 1, further comprising:
    determining pointing direction and/or beam width of the candidate beam based on one or more of measurement statistics and physical properties of the wireless radio transceiver device.

9. The method according to claim 1, wherein the beamforming settings are configured for reception of a transmission only in a single transmission resource.

10. The method according to claim 9, wherein the transmission resource corresponds a single orthogonal frequency-division multiplexing (OFDM) symbol, a single subframe, a single Transmission Time Interval (TTI), multiple OFDM symbols, multiple subframes, or multiple TTIs.

11. The method according to claim 1, further comprising:
    providing an indication to the access node to increase robustness of modulation and coding scheme or rank in a later transmission resource, wherein configuring the beamforming settings is performed during said later transmission resource.

12. The method according to claim 11, wherein the indication comprises a first Channel Quality Indicator (CQI), a first Rank Indicator (RI), or both of the first Channel Quality Indictor and the first Rank Indicator.

13. The method according to claim 12, wherein
the first CQI is obtained based on modifying a second CQI, and
the first RI is obtained based on modifying a second RI.

14. The method according to claim 1, further comprising:
obtaining an indication of drop in signal strength, channel rank of a transmission from an access node, or both of the drop in signal strength and the channel rank of a transmission, wherein
the configuring the beamforming settings is performed in response to obtaining the indication.

15. The method according to claim 1, wherein configuring the second receiver chain to receive transmissions from the access node via the candidate beam is performed according to a schedule.

16. The method according to claim 1, wherein the first receiver chain and/or the second receiver chain comprises baseband processor.

17. The method according to claim 1, wherein each of the first receiver chain and the second receiver chain is operatively connected to its own analog beamformer.

18. A wireless radio transceiver device for configuring beamforming settings, the wireless radio transceiver device comprising a first receiver chain, a second receiver chain, and processing circuitry, the processing circuitry being configured to cause the wireless radio transceiver device to:
configure the first receiver chain to receive transmissions from an access node via a first beam;
configure the second receiver chain to receive transmissions from the access node via a second beam;
obtain a first performance indicator for the first beam based on a transmission from the access node received via the first beam and the first receiver chain;
obtain a second performance indicator for the second beam based on a transmission from the access node received via the second beam and the second receiver chain;
based on the first and second performance indicators, determining whether the first beam is performing better than the second beam;
as a result of determining that the first beam is performing better than the second beam, configure the second receiver chain to receive transmissions from the access node via a candidate beam, wherein, while the second receiver chain is configured to receive transmissions from the access node via the candidate beam, the first receiver chain continues to be configured to receive transmissions from the access node via the first beam; and
evaluate the candidate beam.

19. An access node comprising the wireless radio transceiver device according to claim 18.

20. A mobile communication device comprising the wireless radio transceiver device according to claim 18.

21. A wireless radio transceiver device for configuring beamforming settings, the wireless radio transceiver device comprising a first receiver chain and a second receiver chain, and further comprises:
processing circuitry; and
a computer program product storing instructions that, when executed by the processing circuitry, causes the wireless radio transceiver device to:
configure the first receiver chain to receive transmissions from an access node via a first beam;
configure the second receiver chain to receive transmissions from the access node via a second beam;
obtain a first performance indicator for the first beam based on a transmission from the access node received via the first beam and the first receiver chain;
obtain a second performance indicator for the second beam based on a transmission from the access node received via the second beam and the second receiver chain;
based on the first and second performance indicators, determining whether the first beam is performing better than the second beam;
as a result of determining that the first beam is performing better than the second beam, configure the second receiver chain to receive transmissions from the access node via a candidate beam, wherein, while the second receiver chain is configured to receive transmissions from the access node via the candidate beam, the first receiver chain continues to be configured to receive transmissions from the access node via the first beam; and
evaluate the candidate beam.

22. A computer program product comprising a non-transitory computer readable medium comprising a computer program for configuring beamforming settings, the computer program comprising computer code which, when run on processing circuitry of a wireless radio transceiver device comprising a first receiver chain and a second receiver chain, causes the wireless radio transceiver device to:
configure the first receiver chain to receive transmissions from an access node via a first beam;
configure the second receiver chain to receive transmissions from the access node via a second beam;
obtain a first performance indicator for the first beam based on a transmission from the access node received via the first beam and the first receiver chain;
obtain a second performance indicator for the second beam based on a transmission from the access node received via the second beam and the second receiver chain;
based on the first and second performance indicators, determining whether the first beam is performing better than the second beam;
as a result of determining that the first beam is performing better than the second beam, configure the second receiver chain to receive transmissions from the access node via a candidate beam, wherein, while the second receiver chain is configured to receive transmissions from the access node via the candidate beam, the first receiver chain continues to be configured to receive transmissions from the access node via the first beam; and
evaluate the candidate beam.

* * * * *